July 22, 1941.   L. M. BALLAMY ET AL   2,250,247
SPRING SUSPENSION FOR ROAD VEHICLES
Filed Dec. 26, 1940   3 Sheets-Sheet 2
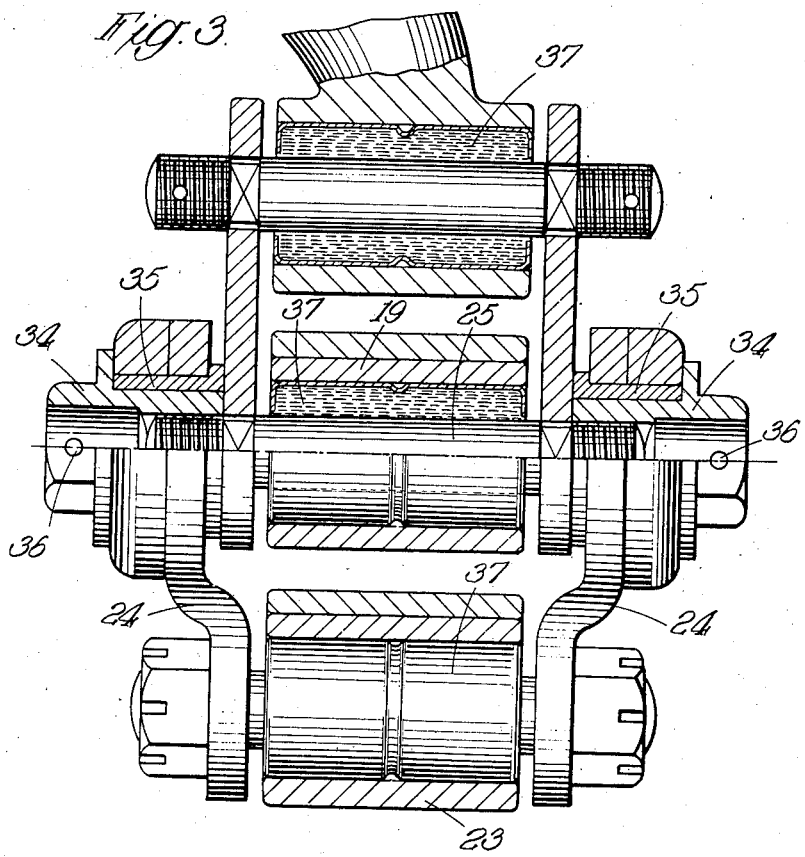
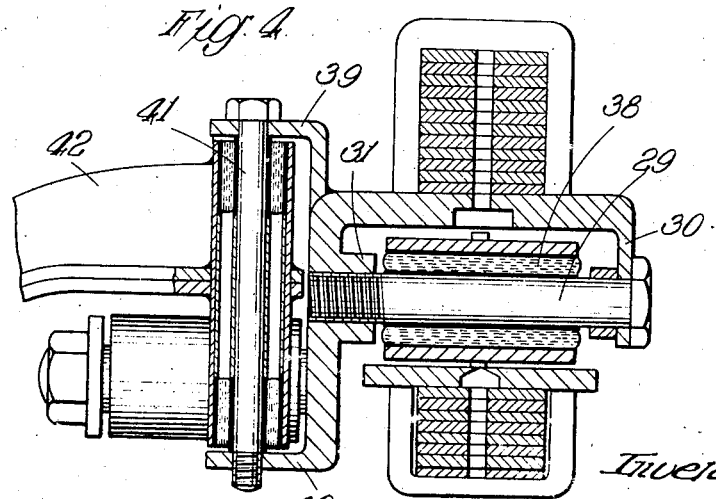
Inventors
Leslie M. Ballamy
Richard H. Sheepshanks
By [signature] Atty.

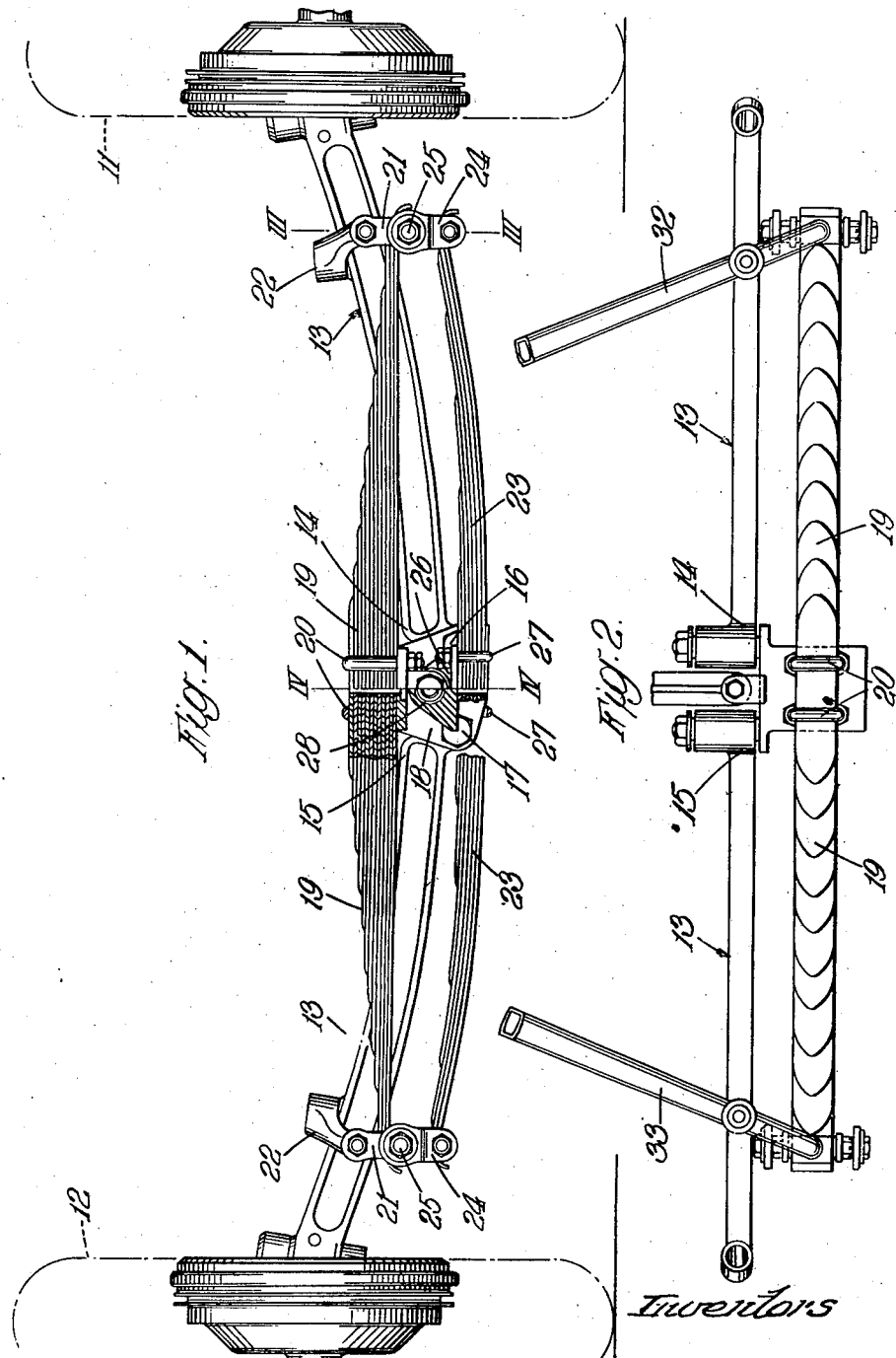

Patented July 22, 1941

2,250,247

UNITED STATES PATENT OFFICE 2,250,247

SPRING SUSPENSION FOR ROAD VEHICLES

Leslie Mark Ballamy, Wallington, and Richard Hasell Sheepshanks, Eyke, Woodbridge, England Application December 26, 1940, Serial No. 371,798
In Great Britain July 26, 1939

3 Claims. (Cl. 267—45)

This invention relates to wheel suspension systems for the front or rear wheels, whether driven or non-driven, of motor vehicles having transverse springs, and is applicable to independent wheel suspension systems, as well as to the more common form of suspension in which the axles are solid.

The invention has for an object to provide improved suspension systems whereby an opposite pair of wheels is kept in more continuous contact with the road surface without losing the benefits of the springing.

Another object of the invention is to provide an improved suspension system for a vehicle having solid axles, which is such that a tendency for the chassis to be displaced transversely of the wheel spindles, which tendency arises when the vehicle is cornering, shall be counteracted.

According to the invention, an opposite pair of wheels of a motor vehicle are supported at the opposite ends respectively of two transverse springs, one of which is fastened intermediately of its length to the chassis and comprises the normal transverse spring, whilst the other is pivoted intermediately of its length to the chassis about a fore and aft axis and comprises an additional transverse spring.

Where the wheels are connected by a solid or a two-part axle, the wheels may be connected to the two transverse springs by shackles connecting the ends of the springs together and to the corresponding ends of the axle.

The additional transverse spring may be mounted either above or below the normal transverse spring, and its fore and aft pivot may be above or below said additional transverse spring.

The normal and additional transverse springs preferably have a different periodicity, with the result that the tendency for the normal spring to cause the wheels to bounce is counteracted.

The invention is illustrated by the accompanying drawings, of which:

Figure 1 is a front elevation showing the improved suspension applied to an opposite pair of wheels carried by a two-part axle;

Figure 2 is a corresponding plan view;

Figure 3 is a part sectional side elevation on the line III—III of Figure 1;

Figure 4 is a sectional side elevation taken on the line IV—IV of Figure 1, and

Figure 5:
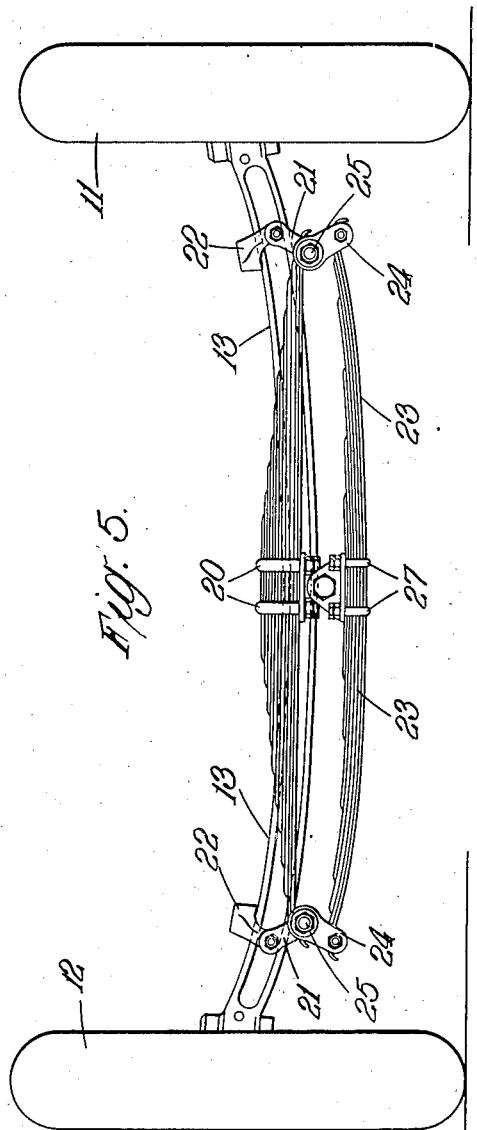
Figure 5 is a diagrammatic front elevation showing the improved suspension used in conjunction with a solid axle.

Referring to Figures 1 to 4, an opposite pair of wheels 11 and 12 are mounted in the known way at the opposite ends respectively of a two-part axle 13. The inner ends 14 and 15 of the two axle parts are pivoted at 16 and 17 respectively about the parallel fore and aft axes to a bracket 18 secured to the chassis (not shown). The normal transverse spring 19 extends over the upper part of the bracket 18 to which it is securely clamped by two inverted U bolts 20. The ends of the spring 19 are connected with the corresponding ends of the axle 13 by shackles 21, which extend upwardly from the ends of the spring. The upper ends of the shackles 21 are pivoted to forwardly and downwardly extending arms 22 on the axle 13.

An additional transverse spring 23 of lighter construction than the normal transverse spring 19 has its ends connected with the ends of the spring 19 by shackles 24, the lower ends of the shackles being pivoted to the spring 23 whilst the upper ends thereof are pivoted about the pins 25 which serve to connect pivotally the shackles 21 and the spring 19. The shackles 21 and 24 can swing independently of one another. The additional transverse spring 23 has clamped thereto intermediately of its length and at its upper side an upstanding bearing member 26, which is fastened to the spring by U bolts 27. The bearing member 26 has a bore 28 extending therethrough fore and aft of the vehicle and receives a bearing pin 29 fastened through lugs 30 and 31 on the bracket 18.

Bracing members 32 and 33 may serve in a known manner to connect the outer ends of the axle 13 with a remote fixed pivotal mounting (not shown), the pivotal mounting having two pivotal axes co-axial with those of the bearing pins 16 and 17.

Referring particularly to Figure 3, the shackle pin 25 of the normal transverse spring 19 has threaded at both ends thereof a nut 34 which forms a smooth bearing for the shackles 25 connected to the ends of the additional transverse spring 23. The shackles 24 have anti-friction bushes 35, and the nuts 34 are locked against unscrewing by cross pins 36. All the shackle pins are surrounded by resilient sleeves 37 which absorb a degree of shock and prevent wear and rattle.

It will be seen in Figure 4 that the bearing pin 29 which pivotally supports the centre of the additional spring 23 is also surrounded by a resilient sleeve indicated at 38. The bracket 18 has upper and lower rearwardly extending lugs 39 and 40 which support about a vertical axis a bearing pin 41 around which is pivoted a rearwardly extending arm 42 which at its free end connects the two track rod parts and the main steering arm, in a known manner.

The construction shown in Figure 5 is similar to that already described except that the axle 13 is a single solid axle and is not connected with the bracket 18. In this case, however, the additional transverse spring 23 is slightly longer than the normal transverse spring 19 so that the shackles 24 connecting the ends of said springs extend upwardly and inwardly from their points of connection with the additional spring.

The additional transverse spring may be located above the normal spring. In both cases, however, the additional spring need not be directly above or below the normal spring, but can be disposed either to the front or the rear of the latter. Also the shackles of the additional spring may be connected with the hub casings or directly with the wheel axle.

One of the transverse springs may be of such strength and shape that when assembled it imparts a stress or preloading to the other spring which latter, upon one or other of the road wheels lifting, is capable of taking an increased load as the load applied thereto by the first spring is diminished.

What we claim is:

1. A wheel suspension system for motor vehicles including a wheel supporting axle and two transverse springs arranged in superimposed relation, the central portions of the springs being respectively above and below the bottom of the axle, and the outer ends of both springs being connected relative to each other and to the axle at points below the axle, the lower spring being centrally mounted for pivotal movement with respect to the upper spring.

2. A wheel suspension system for motor vehicles in which an opposite pair of axle carried wheels are arranged at the opposite ends respectively of two transverse springs, one of which is fastened intermediate of its length to the chassis, while the other is pivoted intermediate its length to the chassis about a fore and aft axis, the ends of the springs remote from the chassis connection being arranged below the axle.

3. A wheel suspension system for motor vehicles in which an opposite pair of axle carried wheels are arranged at the opposite ends respectively of two transverse springs, one of which is fastened intermediate of its length to the chassis, while the other is pivoted intermediate its length to the chassis about a fore and aft axis, the outer ends of the springs being disposed below the axle, and means for movably connecting such outer ends of the springs to each other and to the axle.

LESLIE MARK BALLAMY.
RICHARD HASELL SHEEPSHANKS.